(12) United States Patent
Frederick et al.

(10) Patent No.: US 7,398,008 B2
(45) Date of Patent: Jul. 8, 2008

(54) COPY PROTECTION FOR ANALOG VIDEO SIGNALS FROM COMPUTING DEVICES

(75) Inventors: John W. Frederick, Spring, TX (US); Christopher D. Voltz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1075 days.

(21) Appl. No.: 10/247,090

(22) Filed: Sep. 19, 2002

(65) Prior Publication Data

US 2004/0057698 A1 Mar. 25, 2004

(51) Int. Cl.
*H04N 5/91* (2006.01)
*H04N 9/00* (2006.01)
*H04N 7/167* (2006.01)
*G11B 15/04* (2006.01)

(52) U.S. Cl. .............................. 386/94; 386/44; 360/60; 380/201; 380/203

(58) Field of Classification Search .................... 386/94, 386/1, 44, 109; 348/616, E7.056, E7.058; 360/5, 60; 375/130; 380/22, 201, 203, 204, 380/205, 213, 224
See application file for complete search history.

(56) References Cited

U.S. PATENT DOCUMENTS

| | | | |
|---|---|---|---|
| 4,631,603 A | 12/1986 | Ryan | |
| 4,716,588 A * | 12/1987 | Thompson et al. | 380/224 |
| 4,819,098 A | 4/1989 | Ryan | |
| 5,251,041 A * | 10/1993 | Young et al. | 386/44 |
| 5,633,927 A * | 5/1997 | Ryan et al. | 380/204 |
| 5,689,559 A * | 11/1997 | Park | 380/203 |
| 5,745,604 A | 4/1998 | Rhoads | |
| 5,748,763 A | 5/1998 | Rhoads | |
| 5,748,783 A | 5/1998 | Rhoads | |
| 5,761,302 A * | 6/1998 | Park | 380/201 |
| 5,907,655 A * | 5/1999 | Oguro | 386/94 |
| 5,907,657 A * | 5/1999 | Shima | 386/94 |
| 5,953,417 A | 9/1999 | Quan | |
| 5,991,500 A * | 11/1999 | Kanota et al. | 386/94 |
| 6,222,878 B1 * | 4/2001 | McCallister et al. | 375/225 |
| 6,222,978 B1 * | 4/2001 | Hirai | 386/1 |
| 6,618,549 B1 * | 9/2003 | Kato et al. | 386/94 |
| 6,690,880 B1 * | 2/2004 | Rinaldi | 386/94 |
| 6,996,236 B1 * | 2/2006 | England et al. | 380/213 |

OTHER PUBLICATIONS

*Patents promise copy protection for DVD movies*, EDTN network, http://www.edtn.com/news/june24/062498tnews2.html; Jun. 24, 1998, 3 pgs.
M. Yeung, B. Yeo, and M. Holliman, *Digital Watermarks: Shedding Light On The Invisible*, IEEE Micro, pp. 32-41, (Nov.-Dec. 1998).

* cited by examiner

*Primary Examiner*—Thai Q. Tran
*Assistant Examiner*—Syed Y. Hasan

(57) ABSTRACT

A copy protection method and apparatus is provided to inhibit unauthorized viewing or copying of a video signal. A varying set of additional or invalid video pulses are generated onto a typical video signal. A pulse sequence identifier identifies the location of the invalid or additional pulses and is likewise generated onto the video signal prior to the occurrence of the identified pulses. The combined signal is received at an authorized display which then decodes or filters the additional or invalid portion of the video signal from the original signal according to a decode protocol stored in local memory. A resultant video output signal is guaranteed from only the original signal.

10 Claims, 8 Drawing Sheets

| Entry | Code | Horizontal Sync Sequence | Next Valid Code Location |
|---|---|---|---|
| ... | ... | ... | ... |
| 1 | 10101001 | 1 valid, 3 invalid, 5 valid, 2 invalid | 5th blanking line on next frame |
| 2 | 10101010 | 3 valid, 2 invalid, 4 valid, 3 invalid | 32nd blanking line on next frame |
| 3 | 10101011 | 2 valid, 3 invalid, 3 valid, 4 invalid | 3rd blanking line on second frame |
| ... | ... | ... | ... |

Figure 5

COPY PROTECTION FOR ANALOG VIDEO SIGNALS FROM COMPUTING DEVICES

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to copy-protected video playback systems and more particularly to protection against unauthorized copying of video signals from computing devices.

2. Description of the Related Art

The Digital Video Disk (DVD) format gives consumers the ability to view exceptional quality video. In many instances, DVD players have replaced VHS players for home movie viewing. In addition, the DVD player functionality is now a feature of many of the personal computers (PCs) that are sold on the consumer market. This is a valuable feature that allows consumers to watch DVD movies on the PC.

Concurrently, video converters have also become available to allow consumers to use the standard TV as a monitor for PC. A combination of the PC DVD player along with video converter allows consumers to play video games and watch DVD movies using a large screen display. However, the DVD format also allows individuals to make near commercial-quality VHS recordings from any unprotected DVD program. The consumer is able to connect the output signal of the converter to the input of a VCR where the DVD signal may be recorded. Since the movie is stored digitally on a DVD disk, a high quality copy can be made of the movie.

As DVDs increase in resolution, movie studios have become increasingly concerned about consumers' ability to make high quality copy of movies. If widespread copying of DVD movies resulted, movie studios would be forced to stop releasing movies on DVD or delay the release of quality movies on DVD.

A number of techniques have been developed to address DVD copy protection. A watermarking process has been contemplated which permanently marks each digital video frame with background noise. Watermark signatures can be recognized by video playback and recording equipment to prevent copying. However placing a watermark signature directly on the video frame presents obvious video quality clarity issues. In addition, a watermarking process contemplates new players or other equipment to support watermarking. These issues, along with the difficult task of obtaining a common compatible standard agreeable among the principal commercial entities, pose significant hurdles to a watermarking solution.

Other non-destructive solutions, from the video signal standpoint, have been proposed. Digital Copy Protection Systems (DCPS) have been developed whereby the DVD player and a digital TV or a digital VCR exchange keys and identification certificates to establish secure channels. In addition, Content Scrambling Systems (CSS) have been proposed as a form of data encryption to discourage reading media files directly from the desk. Here again, encryption keys are exchanged so the video is decrypted before being displayed by the display device. Like the proposed watermarking solution, both of these other proposals require significant additional hardware (and cost) for movie copy protection. In addition, the CSS proposal contemplates a preliminary licensing requirement before any hardware may be implemented.

One approach to copy protection of video signals by Macrovision Corporation of Cupertino, Calif. involves inserting pseudo-synchronization pulses during the vertical blanking interval of video signals and varying the output levels. This confuses the fast phase locked loops (PLLs) and auto-gain controls (AGCs) used on recording devices but does not significantly affect the slower PLLs and AGCs used on televisions.

BRIEF SUMMARY OF THE INVENTION

In a video system, processing of video signals is provided by a copy protection system to inhibit unauthorized viewing and copying of the video signal, such as from the PC DVD player. During a vertical blanking interval (VBI) portion of the video signal, a number of additional horizontal synchronization (H-sync) pulses are generated onto the video signal by a video graphics adapter (VGA). The resultant video signal comprises a set of original H-sync pulses that are output normally from the VGA and the additional H-sync pulses generated by the copy protection system's encoder. The encoder also generates an H-sync pulse identifier onto the video signal after the first H-sync pulse occurrence. The copy protection system's decoder uses a decoding table, provided in a memory of a decoder, and the H-sync pulse identifier to determine which of the following H-sync pulses are valid and which ones are added. Only the valid pulses are used to generate sync pulses for the display monitor.

Increased security is provided as the sequence of valid pulses is constantly changing through generation of successive sequences of additional synchronization pulses different from the preceding sequences. For each successive sequence of additional synchronization pulses, an associated sync pulse identifier is generated. The decoding table includes all of the potential synchronization pulse identifiers along with a matched identifier location to inform the decoder where to look for the next successive synchronization pulse identifier. After a specified number of identifiers have been generated, the process is reset and repeated.

Flexibility is provided through polling of both the encoder (the video source) and the decoder (receiving or display device) to determine if they are authorized devices. If the decoder is not an authorized device the encoder will not output the protected video signal. The copy protection system is enabled only if the video material indicates it should be protected, using existing techniques (such as CGMS).

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIG. 5 is a decode table for the synchronization code of FIG. 4;

DETAILED DESCRIPTION OF PREFERRED EMBODIMENT

The illustrative system described in this patent application provides a technique for protecting video signals against unauthorized copying. For purposes of explanation, specific embodiments are set forth to provide a thorough understanding of the illustrative system. However, it will be understood by one skilled in the art, from reading the disclosure, that the technique may be practiced without these details. Further, although the embodiments are described in terms of a DVD player, it should be understood that this embodiment is illustrative and is not meant in any way to limit the practice of the disclosed system to DVD systems. Also, the use of the term monitor and player to illustrate how the system works is not intended to infer that the illustrative system requires a specific type of display device or video signal generator. Rather, any of a variety of display devices or video signal sources may be employed in practicing the technique described herein. Moreover, well-known elements, devices, process steps, and the like are not set forth in detail in order to avoid obscuring the disclosed system.

As used herein, the term "video signal" includes both RGB and synchronization signals unless otherwise noted. Further, reference to "synchronization signals" refers to both horizontal synchronization (H-sync) and vertical synchronization (V-sync) signals unless otherwise noted. Additionally, reference to RGB signals refers to video signals typically used for red, green, and blue, but should be understood to mean equivalent signals in alternate color spaces.

Furthermore, the description of the various RGB signals and synchronization signals is not intended to imply that separate wiring connections are required for each signal. All of the RGB and synchronization signals may be transmitted across a signal cable typically known as a "composite video" cable or across component video cables, such as S-video or separate R, G, B, H-sync, and V-sync cables, as desired.

Figure 1:
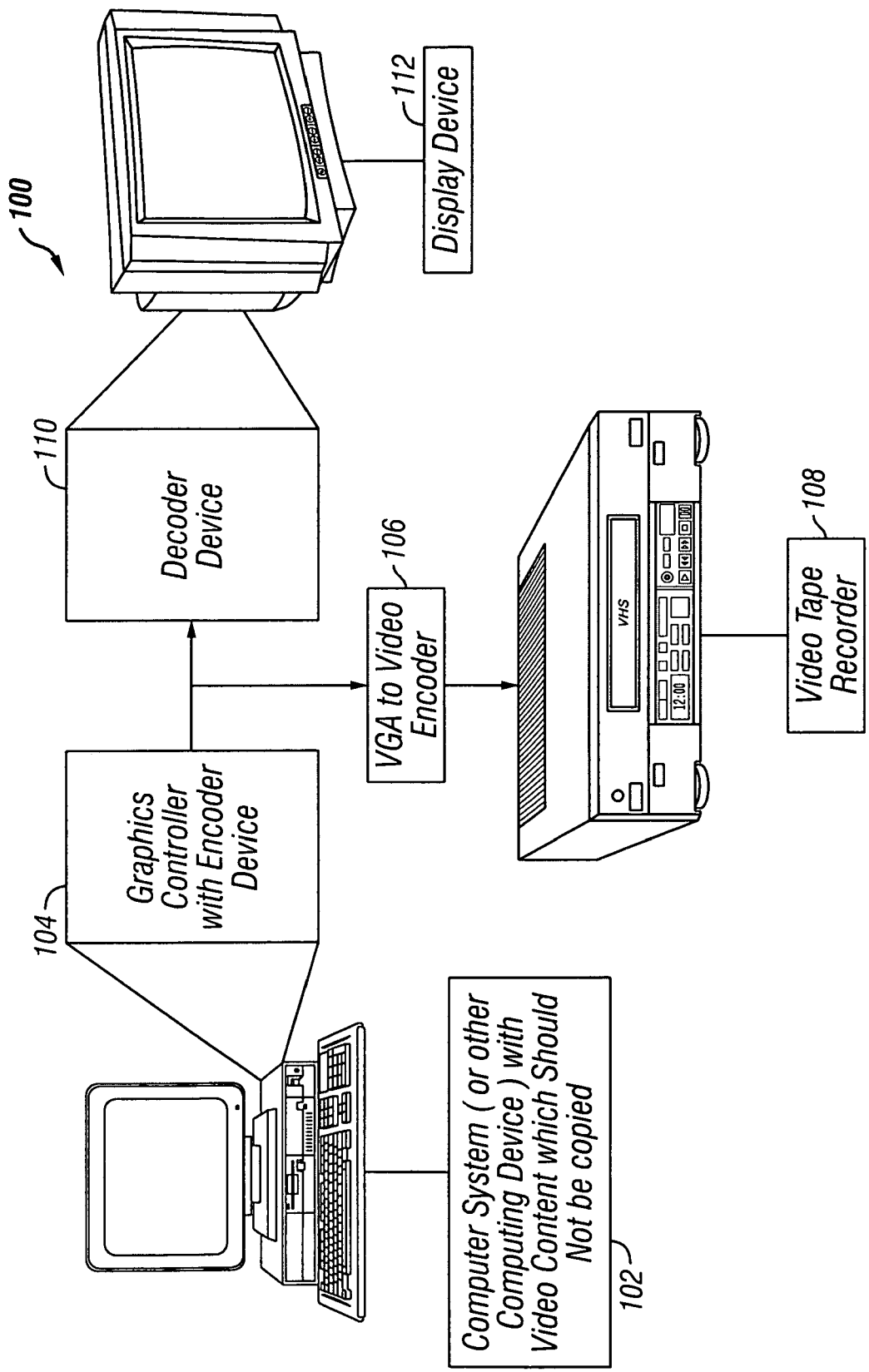
FIG. 1 is a block diagram of an exemplary copy protection system.

Turning to FIG. 1, shown is an exemplary video viewing system 100 employing a copy protection system according to an embodiment of the present invention. A computer system 102 or other computing device provides as its output video content for which certain anti-copy protection is desired. For example, a DVD drive (not shown) embedded into the computer system 102 provides a video signal output that may be copy protected according to an embodiment of the disclosed subject matter. If the computer system 102 did not have the copy protection system and displayed a DVD movie, the output of the computer system 102 could be copied by the VCR 108, resulting in a high-quality copy. FIG. 1 depicts a computer system 102 with the copy protection system and a display device 112 with the copy protection system. In this case, the VCR 108 will be unable to record the DVD movie when the copy protection system is engaged. Of course, it should be noted that the video output is not limited to a signal originated from a DVD drive, but instead can be generated through any number of video sources, such as subscription service of a video download from the Internet or a video transmission satellite, such as a high definition satellite.

The computer system 102 outputs a video signal representing an image being rendered on the computer system 102 to a graphics controller 104, typically associated with a video graphics card in the computer system 102. A VGA to video encoder 106 may be provided to convert the signal for use with a videotape recorder 108 or a display device. According to one embodiment of the disclosed subject matter, before the video signal is output from the computer system 102 to either the display device 112 or the videotape recorder 108, a number of additional signals are incorporated into the horizontal sync signals. Thus, the video signal output from the computer system 102 across communication lines to the display device 112 or 108 includes both an original set of horizontal sync pulses which represents a correct image to be displayed along with a set of additional or invalid sync pulses which, without the present decoding technique, prevents a display from recognizing the signal. This results in a display output that is not recognizable and thus not valuable for copying.

An embodiment of the disclosed subject matter also preferably includes a decoder device 110, either internal or external to the display device 112. The decoder device 110 is programmed to recognize the anti-copying protocol and to decode the original H-sync signals from the combination signal, which includes both the original H-sync pulses along with the added or invalid H-sync pulses. The decoder device 110 then essentially filters out the additional or invalid H-sync pulses and outputs only the original H-sync pulses, thus, providing the original video signal only, without the additional H-sync pulses, to the display 112.

Figure 2:
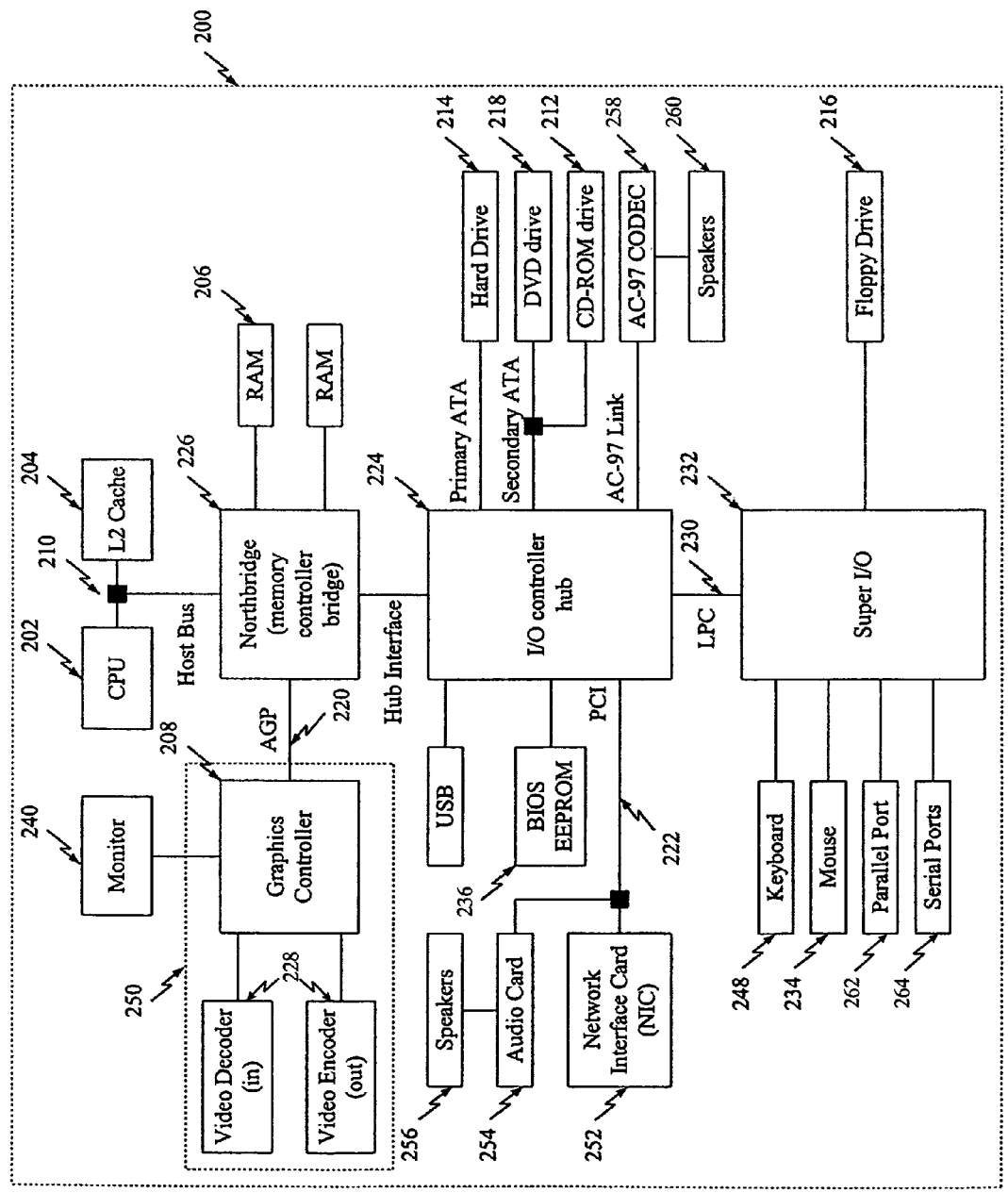
FIG. 2 is a schematic diagram of an exemplary computer architecture of the copy protection system of FIG. 1.

Referring now to FIG. 2, a simplified block diagram of a typical computer system 200 is shown including a video card 250. A central processing unit 202 is coupled to a host bus 210. The central processing unit 202 may be a single microprocessor, such as Intel Corporation's PENTIUM 4® or Advanced Micro Devices, Inc.'s ATHLON™ or a more complete computer system including multiple microprocessors, a cache controller, external co-processors, and other components, coupled to one another or to the host bus 210. The host bus 210 functions to interface the CPU 202 to the rest of the computer system 200. The host bus 210 typically is located on a motherboard but may be configured as any of another of other sub-systems as well known in the art.

Also coupled to the host bus 210 is a cache 204. The cache 204 may be a write-through, a write-back, or multiple cache systems for storing commonly used or recently used data values. The cache generally consists of a high-speed static RAM structure, addressable within the memory space of the CPU's address lines.

A main memory 206, typically comprising a dynamic RAM, is coupled to the memory controller bridge 226. The main memory 206 provides relatively high-speed data storage for instructions and data needed for the processor 202 to perform its functions. Also included in many computer systems is a dedicated ROM 236, providing system BIOS and other firmware sets of instructions to the processor 202, on initial boot up and also thereafter.

Also coupled to the memory controller bridge 226 is an I/O controller hub 224. The I/O controller hub 224 typically has a disk controller with a number of IDE ports to couple external devices. The disk controller in the I/O controller hub 224 provides a connection to a CD-ROM drive 212, a DVD drive 218, and a hard disk drive 214. The CD-ROM drive 212 and the DVD drive 218 provide optical storage and data retrieval capabilities, and the hard drive 214 provides magnetic storage device capabilities to the computer system 200. An AC-97 CODEC 258 and speakers 260 can also be connected to the I/O controller 224.

Also coupled to the I/O controller hub 224 is a PCI bus 222. The disk controller in the I/O controller hub 224 can be a separate device on the PCI bus 222. The PCI bus 222 is coupled to a plurality of additional devices, including a network interface controller 252, an audio device or audio card 254, and in some embodiments an additional PCI bridge (not shown). The audio card 254 generally is coupled to audio speakers 256 or some other audio output device to provide an audio output.

The AGP extension bus 220, coupled to the memory controller bridge 226, provides an extension for additional peripheral components, typically video related. The AGP extension bus 220 is coupled to an additional device, such as the video card 250. The video card 250 typically includes a graphics controller 208 and a video encoder/decoder (CODEC) 228. The video card 250 is coupled to a monitor 240 via one or more coaxial cables or other computer connectors. Alternatively, the graphics controller 208 and the video card 250 can be coupled to the PCI bus 222.

The graphics controller 208 is electronic circuitry that takes data that represents a computed image and converts it to a varying electrical signal that drives an external display device so as to produce a visible representation of the image. A video processor is a set of electronic circuitry which takes data which represents a moving picture (e.g., a movie) and modifies it in some way (e.g., increases the saturation) to generate a resultant data which is typically sent to the graphics controller 208 for display.

In a PC, the graphics controller 208 will typically contain video processing circuitry which is used to change the color space of the input image, scale it, and de-interlace it so it is in a format which the graphics controller 208 can use for display. For example, MPEG uses a $YC_rC_b$ colorspace but all VGAs have ADCs that use the RGB colorspace so the video processing circuitry executes a matrix transformation to convert between the two colorspaces.

An extension bus 230 is coupled to the I/O controller hub 224, providing an extension for additional peripheral components. A super input/output controller 232, coupled to the extension bus 230, typically provides a connection between the extension bus 230, a mouse device 234, a parallel port 262, serial ports 264, and a keyboard device 248. Although these devices are shown coupled through the super input/output controller 232 to the extension bus 230, it should be noted that other configurations are possible; for example, the mouse device 234 and the keyboard 248 may instead be coupled to an infrared device for communicating directly to a remote controller interface (not shown) via wireless technology. Additionally, the super input/output controller 232 provides a connection to a floppy disk drive 216, which provides additional magnetic storage device capabilities for the computer system 200.

The computer system 200 may be of any number of different configurations and components. It will be recognized that additional devices may be coupled via various connects to the various buses. The flexibility of computer system 200 is not restricted to particular example shown in FIG. 2. Instead, a wide variety of systems could be used instead of the disclosed computer system 200 without departing from the spirit of the invention.

According to an embodiment of the disclosed subject matter, copy protection is implemented by reading video data from DVD 218 after a certain internal authentication and encryption is performed. The encrypted video stream is then communicated to the CPU 202, where decryption is performed. CPU software decodes and generates the digital video and audio, which is then communicated across the AGP bus 220, to the video card 250. The audio is sent across the PCI bus 222 to the audio card 254. The video then is output from the video card 250 where a monitor 240 receives the signal through a VGA connector on the back of the video card 250. The monitor 240 may be any display device, such as the display device 112 of FIG. 1.

Figure 3:
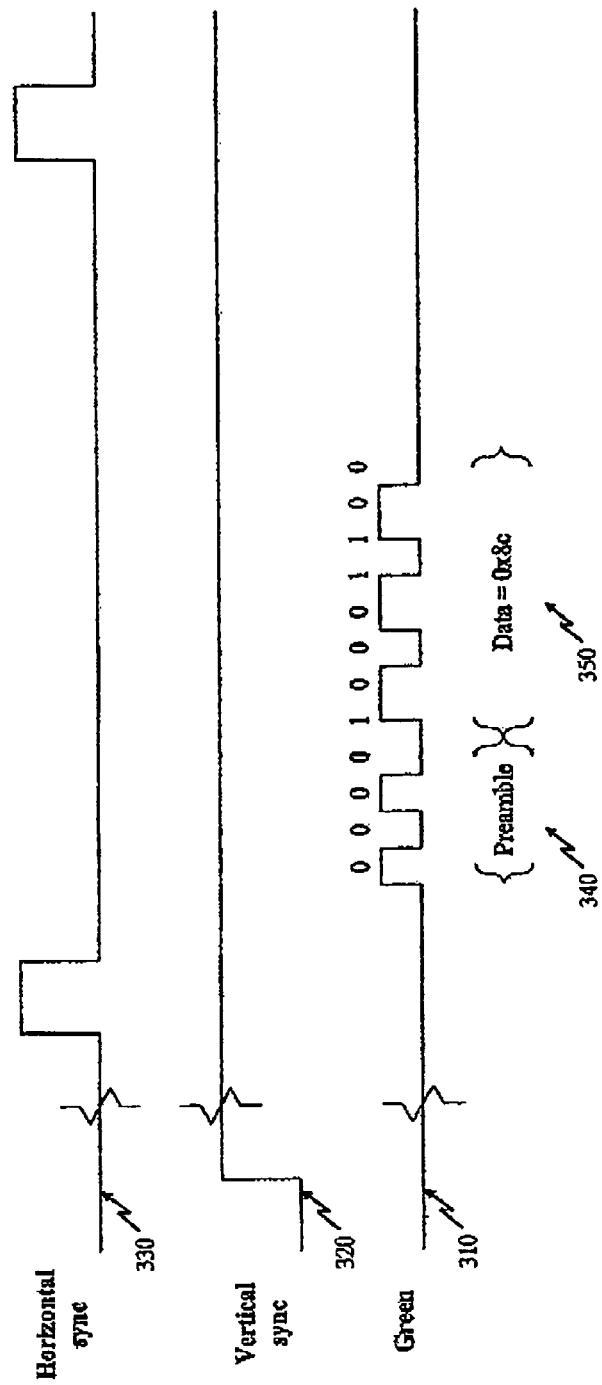
FIG. 3 is a timing illustration of a synchronization code embedded in an RGB signal prior to copy protection.

FIG. 3 depicts an embodiment of the copy protection system. In this case, copy protection data is transmitted on a green signal 310 between two H-sync pulses 332 and 334 on the horizontal sync line 330 and the vertical blanking interval occurs when a vertical synchronization signal 320 is high. The actual encoding of the data and the polarity of the signals can vary. According to one embodiment, a preamble 340 is provided to allow a receiver to synchronize to a clock signal embedded within a data 350 resulting in copy protected transmission of eight bits of data. Other protocols and word lengths can be utilized without departing from the disclosed subject matter. Further, other RGB signal lines and timing outside the vertical blanking intervals can be utilized for transmission of the copy protection signals without departing from the disclosed subject matter.

Figure 4:
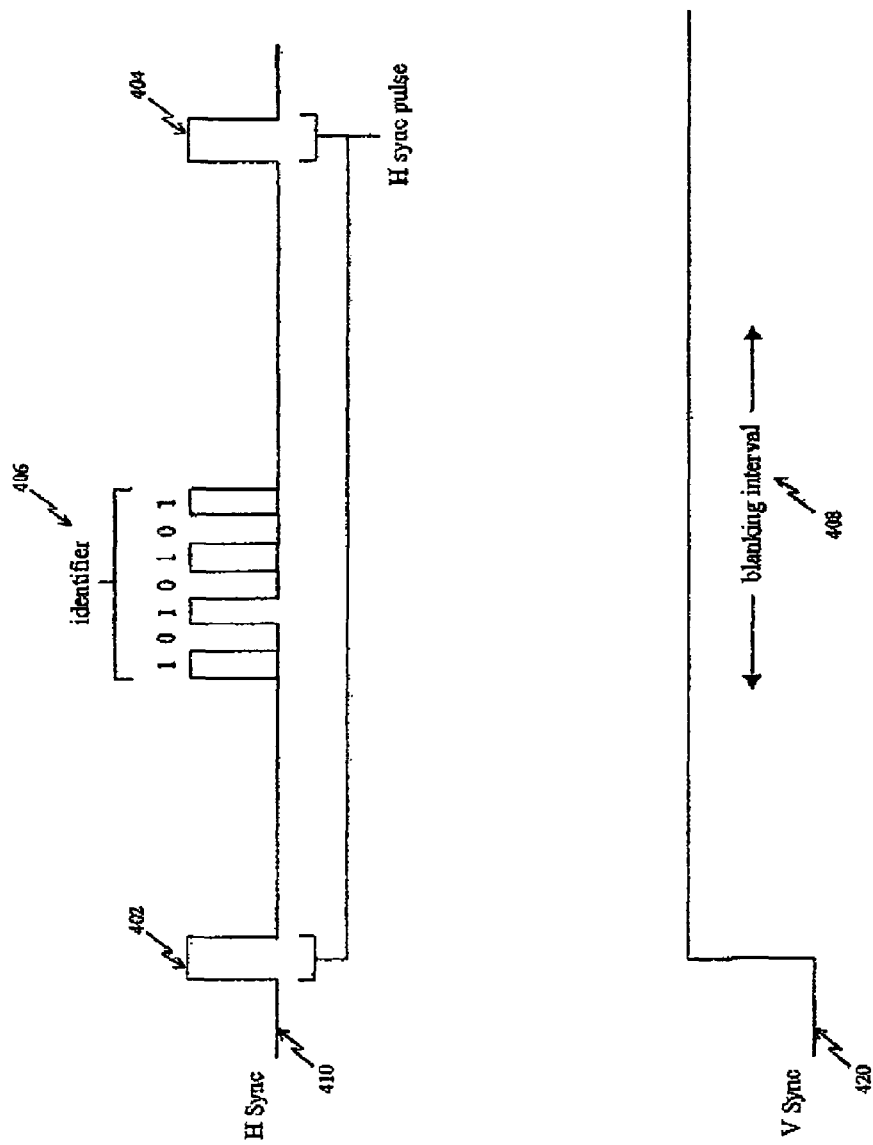
FIG. 4 is a timing illustration of a synchronization code embedded in a synchronization signal prior to encoding as transmitted over the copy protection system of FIG. 1.

Turning now to FIG. 4, shown is the relationship between the H-sync (410) and V-sync (420) video signals. Specifically, H-sync pulses 402 and 404 may be either original H-sync pulses and output from the DVD player or may be additional or invalid H-sync pulses added to the video signal during processing by the video card 250. Also shown is an exemplary pulse sequence identifier 406 which provides information to the decoder on the receiving end, such as decoder device 110, regarding the location of invalid H-sync pulses along with the location of the next pulse sequence identifier (see FIG. 5). According to one embodiment, the pulse sequence identifiers 406 are placed on the H-sync signal 410 during the V-sync blanking interval 408. However, with only minor modifications, the pulse sequence identifiers 406 may be placed at any point within the H-sync signal 410. Thus, during the vertical-blanking interval 408, when the V-sync signal 420 is active, the pulse sync identifier 406 is modulated onto the H-sync line 410 between H-sync pulses 402 and 404, for example. This pulse sync identifier 406 then is read by the receiving authorized display device 112 to determine which H-sync pulse signals are valid signals and which H-sync pulse signals are invalid and should be ignored. According to an alternative embodiment, with only minor modifications, the copy protection signals may be placed on the V-sync signal 420.

Referring now to FIG. 5, shown is an exemplary lookup table 500 according to an embodiment of the disclosed subject matter. With reference to FIG. 4, the receiving display device 112 expects to receive the pulse sequence identifier 406 after the first H-sync pulse 402, during the vertical-blanking interval 408. The pulse sequence identifier 406 that is modulated onto the H-sync signal 410 has a value in this example of 10101010b (where the trailing "b" indicates the value is a binary value). The display 112 then uses the lookup table 500 as part of the decoder device 110 to determine the next sequence of valid H-sync pulses and the location of the next valid pulse sequence identifier 406. According to the lookup table 500, the pulse sequence identifier value 406 provides the information in code column 520 given in entry 2. The horizontal sync sequence 530 of entry 2 informs the decoder device 110 that beginning with the next H-sync pulse sequence, the first three H-sync pulses are valid, the next two H-sync are to be ignored, the next four H-sync pulses are valid and the final three H-sync pulses are to be ignored. This means that the first three H-sync pulses that the decoder device 110 receives are valid and should in fact be used or passed to the display device. The next two H-sync pulses are invalid and should be discarded or filtered from the display device 112. The next four H-sync pulses are valid and should be used, then the next three H-sync pulses are invalid and should be filtered. The addition of the invalid pulses will prevent a receiver device without the copy protection system from locking onto the horizontal synchronization signal thus resulting in a blank display.

The fourth column 540 in the table 500 provides the display 112 with information of the location of the next valid pulse sequence identifier. Thus, for entry 2, the next valid pulse sequence identifier will be received in the $32^{nd}$ blanking line on the next frame. The decoder device 110 is then able to ignore all pulse sequence identifiers occurring between this received pulse sequence identifier and the identifier at the $32^{nd}$ blanking line on the next frame. This feature makes it difficult to determine which pulse sequence identifier is actually controlling the decoder device 110. Until this valid decoding pulse sequence identifier is received, the H-sync sequence is repeated to determine the valid sync pulses. After a specified number of valid pulse sequence identifiers 406 are received, the process is reset and begins anew. This reset feature allows, among others, for quick recovery if the decoding circuit 110 in the display device 112 loses its synchronization. It should be noted the next valid pulse sequence identifier 406 can be generated randomly or according to a finite set of location identifiers or other methods without departing from the disclosed subject matter. Further, the codes in columns 520 and their interpretation in columns 530 and 540 are exemplary and illustrative only, and other codes 520 and interpretations 530 and 540 can be used.

Figure 6:
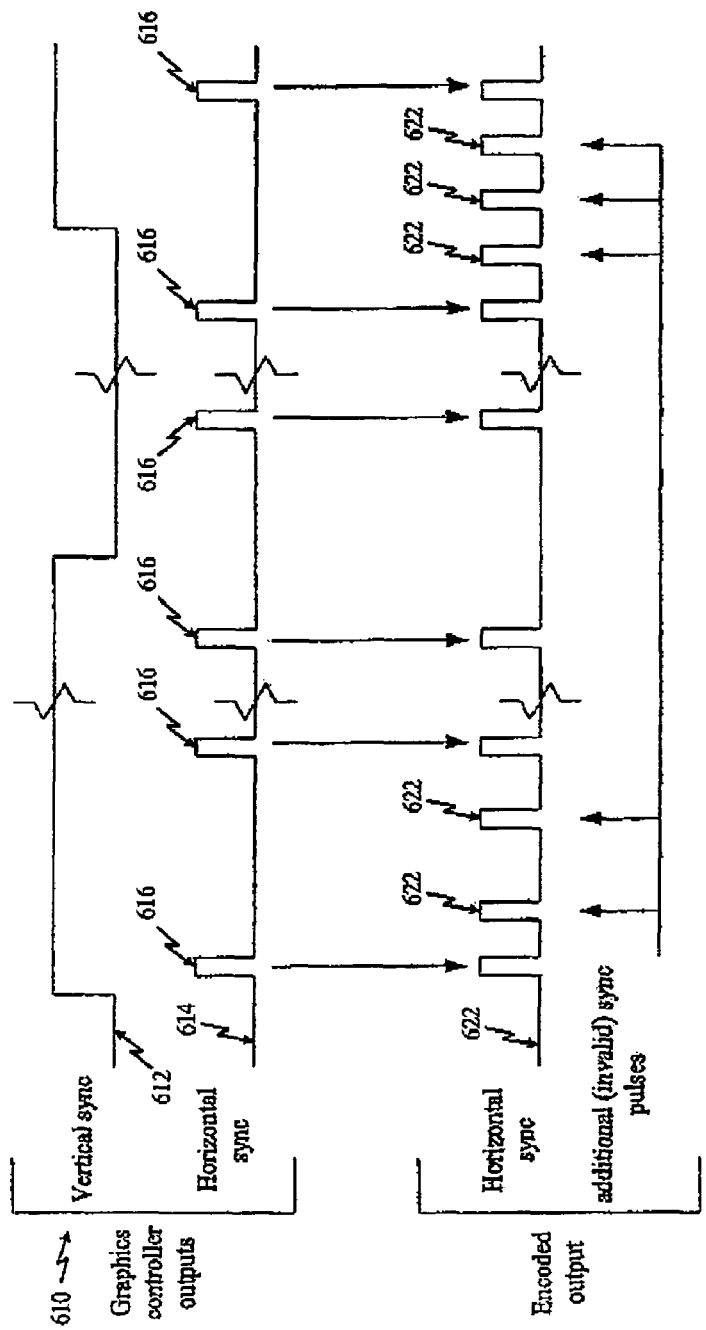
FIG. 6 is a more detailed timing illustration of a synchronization signal before and after encoding as transmitted over the copy protection system of FIG. 1.

Turning now to FIG. 6, shown is a simplified timing diagram illustrating the relationship between original sync pulses and additional or invalid sync pulses. Specifically, the top vertical sync (612) and horizontal sync (614) signal group 610 represents the output from the graphic controller 104 of FIG. 1. This group of signals represents the original unprotected signal output. The bottom horizontal sync signal 620 includes the original horizontal sync pulses 616 of the top horizontal sync signal 614 in combination with the additional or invalid sync pulses 622 which comprise the encoded output. As can be seen, the additional sync pulses 622 are added in a random or non-repeating pattern according to the lookup table 500 of FIG. 5, for example. A previous pulse sync 406 identifier then will have informed the receiving decoding device 110 as to which of the horizontal sync pulses of the encoded output are valid and which should be filtered as invalid pulses.

Figure 7:
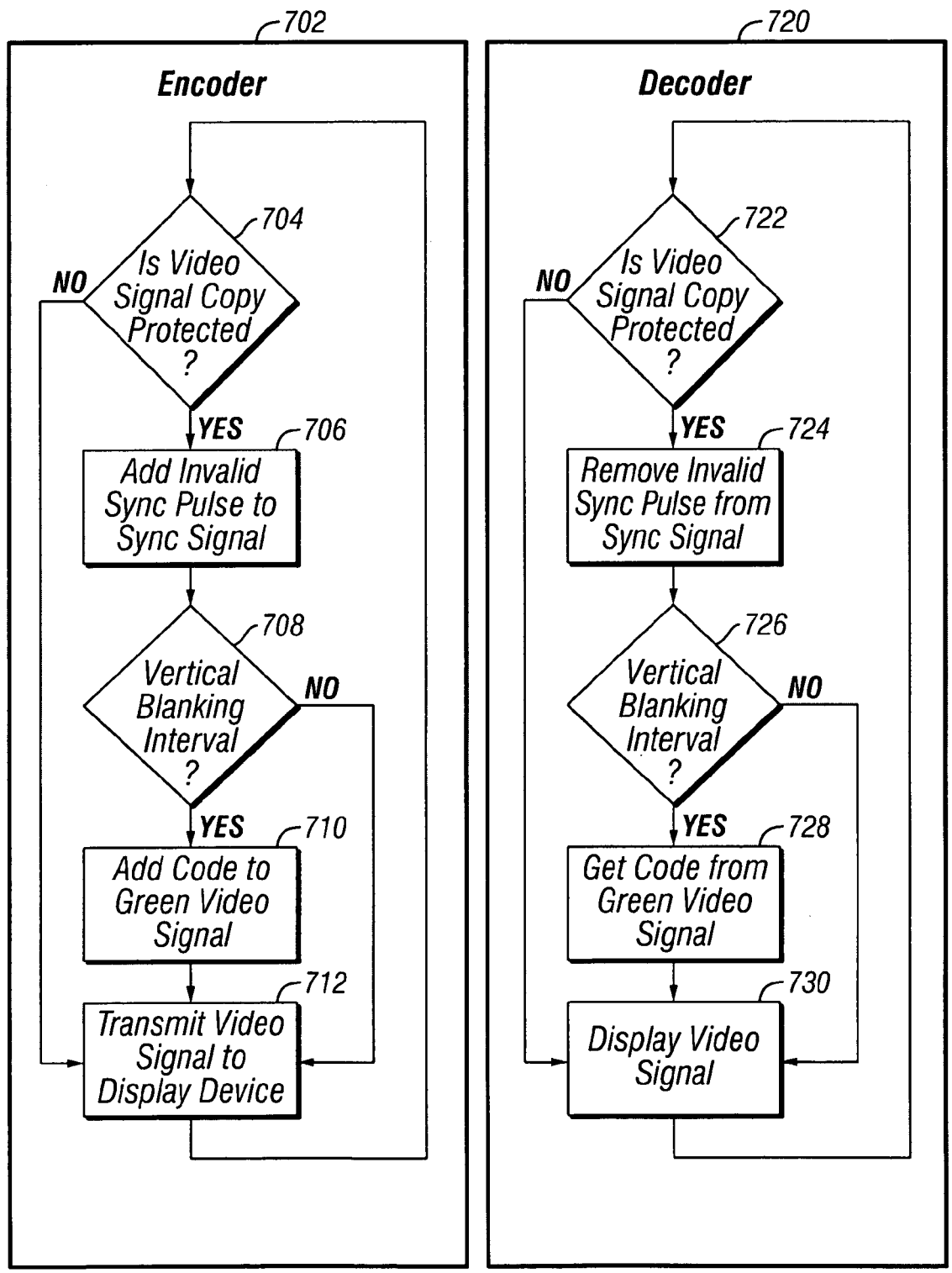
FIG. 7 is a flow diagram illustrating an exemplary copy protection scheme for the copy protection system of claim 1.

Turning now to FIG. 7, shown are flow diagram for the encoding (702) and decoding (720) processes. Referring back to FIG. 1, the encoding process 702 occurs at a DVD or other video signal generation side of the viewing system 100, such as at the computer system 102 and the graphics controller 104. The decoder decoding process 720, on the other hand, occurs at the display device 112 and at the decoder device 110. Beginning with the video signal generation side, a video signal is encoded according to the encoding process 702. Beginning at step 704, the encoding process is initiated once the video signal has been determined to be a copy protected video signal. In other words, for video signals that do not require any copy protection, the encoding process, including adding additional H-sync pulses and pulse sequence identifiers, is bypassed, allowing the video signal to be transmitted in its original form at step 712. If the video signal is indicated as a video signal to be copy protected, the process continues at step 706 where invalid H-sync pulses 622 are added to the set of original H-sync pulses 616 as shown in FIG. 6. In step 708, according to one embodiment, the system detects whether the outgoing signal is within a vertical blanking interval. If so, at step 710 the pulse sequence identifier 406 is added to the video signal shown in FIG. 7 as a green signal 310 of FIG. 3. If not, the now combined set of original H-sync pulses 616 and invalid H-sync pulses 622 are directly transmitted as the outgoing video signal to the display device at 712. According to one embodiment, the pulse sequence identifiers 406 are added to the green video signal (not shown in FIG. 6) only during a vertical-blanking interval. It should be understood that with minor modifications to the disclosed embodiment, such a restriction is not required and pulse sequence identifiers 406 may be incorporated into the outgoing video signal at any point in time.

On the decoding side, the decoding process 720 begins at step 722 where the decoder device 110 detects whether the video signal is copy protected. If not, the video signal is immediately passed to the display device 112 where it is displayed. In that instance, no invalid H-sync pulses 622 have been added, thus, there is no need to perform any filtering function. If the video signal is in fact copy protected, control proceeds to step 724 where the decoder device 110 recognizes invalid H-sync pulses 622 from original H-sync pulses 616 based on a prior received pulse sequence identifier 406. At step 724, the decoder device filters out all invalid H-sync pulses 622 from the original H-sync pulses 616. The original H-sync pulses 616 are then passed to the display device 112, which then displays the image represented by the video signal as intended. At step 726, if within a vertical blanking interval, the decoder device receives the next pulse sequence identifier 406 at step 728. This next pulse sequence identifier 406 represents the next sequence of valid and invalid H-sync pulses 616 and 622 and, in addition, the location of the next valid pulse sequence identifier 406. This information is used to decode the next set of H-sync pulses. If not within a vertical blanking interval at step 726, the decoding device 110 does not attempt to detect such a pulse sequence identifier 406, but instead, directly transmits the decoded video signal or filtered video signal to the video display device 112. The video display device 112 may then display the video signal at step 730. Additional steps such a validation and authentication of the source and receiver devices can be added within the spirit of this invention.

Although shown in FIG. 7 as the green video signal, the video signal encoded or decoded by encoding steps 702 or decoding steps 720 can be any video signal. One skilled in the art will recognize that the flowcharts of FIG. 7 are exemplary and illustrative only and other techniques or steps and other ordering of steps could be used. Additionally, the illustrated steps can be implemented in multiple ways, including software, firmware, or hardware.

Figure 8:
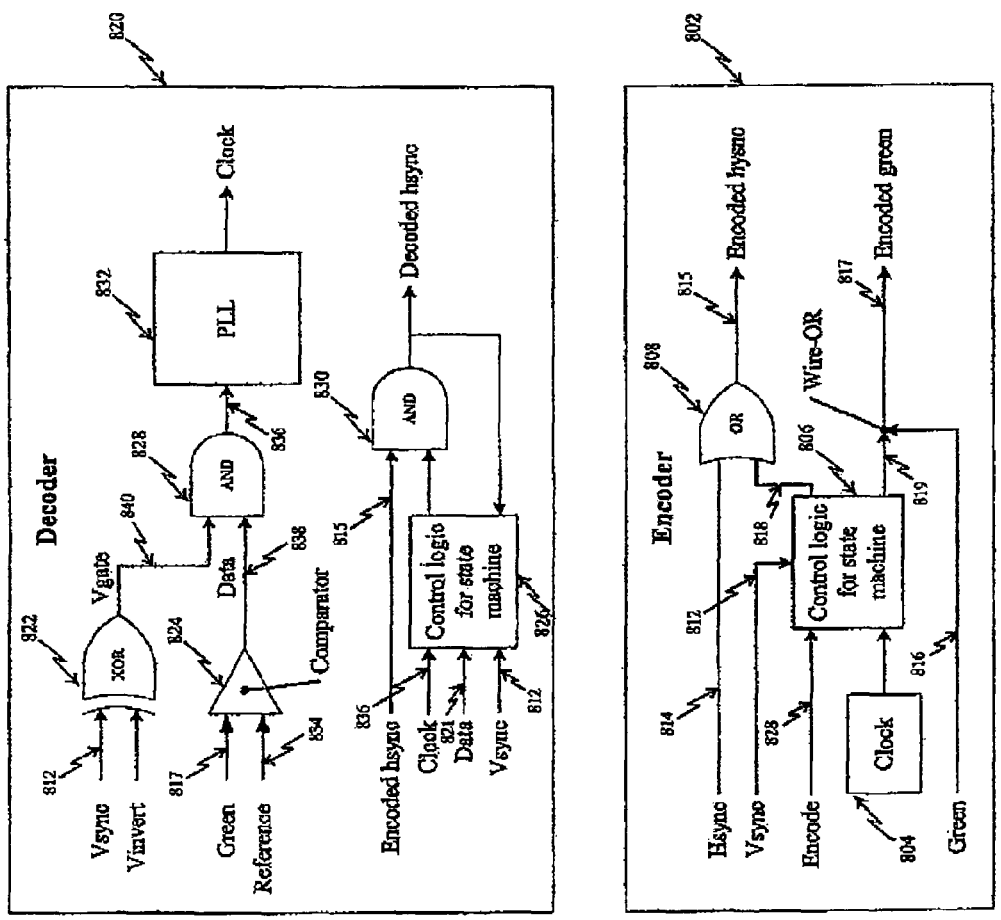
FIG. 8 illustrates logic associated with the copy protection systems of FIG. 1.

Turning now to FIG. 8, shown are schematic representations of logic associated with the encoding process and decoding process. At the video signal generation side, the encoder is represented by encoder logic 802. The encoder logic 802 illustrates an exemplary embodiment for combining the encoded control logic output containing the additional or invalid H-sync signals 622 onto the original H-sync signal 814, corresponding to the signal 614 of FIG. 6, containing the original set of H-sync pulses 616. The Encode input 810 indicates whether the copy protection system should be engaged. The Hsync and Vsync signals 814 and 812 are the unencoded synchronization signals from the VGA's CRT controller 250 of FIG. 2. The clock 804 is a free running oscillator. The state machine 806 generates both the additional horizontal synchronization pulses 622 to be inserted into the horizontal synchronization signal 814 and the control word (the pulse sequence identifier 406) to be inserted into the green signal 816. Output 818 of the state machine 806 is ORed by OR gate 808 with the original horizontal synchronization signal 814 to generate the encoded horizontal synchronization signal 815 (corresponding to signal 620 of FIG. 6). XOR gates can be inserted onto the various synchronization pulse inputs and outputs to control polarity. The other output 819 of the state machine 806 is wire-ORed (i.e., the output is physically connected) to the green output 816 to generate the encoded green output 817. This works because the green output 816 will be low during the vertical-blanking interval. A simple variation would be to switch the green output 816 between the VGA's green output 819 and the output of the state machine 806. The output level of the green signal 817 could then be increased when the pulse sequence identifier 406 is sent. This would potentially damage receivers that do not support the copy protection system that attempted to connect to the copy protected output. In one embodiment, the encoder 802 can be integrated into the VGA.

The decoding process is represented by decoder logic 820. According to one embodiment, decoding of the encoded H-sync signal 815 encoded by encoder 802 is performed by control logic 826, receiving input pulse sequence identifier information from the data 821 of the green signal output 817 as well as the V-sync signal 812 to determine when a vertical blanking interval occurs. The XOR gate 822 is used to invert the vertical synchronization pulse producing the Vgate signal 840 in the case where the vertical synchronization is active low instead of high. The receiving device can determine the polarity of the V-sync synchronization signal 812 using standard techniques known to those skilled in the art. The comparator 824 is used to convert the incoming analog signal on the green line 817 to a digital signal by comparing it to a specific voltage reference 834. The output of the comparator 824, data signal 838, is gated by the AND gate 828 with the Vgate signal 840 so the PLL 832 clock input 836 is only active when a pulse sequence identifier is being received. This allows the PLL 832 to recover the clock in the control word so the data signal 838 can be decoded. The clock 836, the data 838, and the V-sync synchronization pulses on the Vgate signal 840 are used to drive the state machine 826 that controls the gating of the horizontal synchronization pulses on encoded H-sync signal 815. The encoded horizontal synchronization is gated by the AND gate 830 in conjunction with the output of the state machine 826 so the original horizontal synchronization signal 814 is reconstructed. An additional XOR gate could be included to allow the output polarity of the horizontal synchronization signal 814 to be inverted. In one embodiment, the decoder 820 is integrated into logic within the receiving device 112. One skilled in the art will recognize that the logic elements shown in FIG. 8 are exemplary and illustrative only, and other logic elements and other connections or arrangements of logic elements can be used.

Thus, according to the disclosed subject matter, a video signal copy protection apparatus and protocol is provided. The protocol is flexible to provide copy protection for any number of video signal sources including DVD, protected satellite transmissions and other subscription type video services. A computer system or device is provided with encoding functions to add video protection signals onto an original video output. Specifically, a number of additional horizontal synchronization pulses, indistinguishable from original horizontal synchronization pulses, are added onto the horizontal synchronization signal. Without decoding, inclusion of these additional H-sync pulses prevent a display device or a video tape recorder from receiving or generating a coherent video image from the modified video signal. The computer system or computer device also modulates onto a portion of the outgoing video signal an identifier code for use in the decoding process.

A decoder device is provided to receive the modified H-sync signal, including the original H-sync pulses along with the added H-sync pulses and the rest of the video signal including the identifier code. The decoder device decodes the H-sync signal according to the identifier code, which identifies the original H-sync pulses from the additional H-sync pulses. A lookup table is provided at the decoder device to allow for a number of constantly changing mapping schemes represented by an equal number of different identifier codes. The decoder device then filters the added or invalid H-sync pulses from the video signal and passes the filtered signal to the display device. Enhanced copy protection is provided as the sequence of added H-sync pulses is constantly changing, this function is supported by the simplicity of the lookup table and the fact that attached with every sequence of added H-sync pulses is also included a next pulse sequence identifier and the location of the next pulse sequence identifier.

Additional copy protection is provided by encoding a number of invalid H-sync pulse identifiers along with the valid H-sync pulse identifiers. Specifically, H-sync pulse identifiers are encoded onto the video signal at varied locations in the video signal. Only the sequence identifier that is received at the expected identifier location at the decoder device is actually used to perform the decoding functions. Thus, a multi-level copy protection system is provided with only minor modifications to a computer system along with a receiving or authorized display device.

The foregoing disclosure and description of the various embodiments are illustrative and explanatory thereof, and various changes in the video source video player, the display device, the computing device, the description of the video signal, the graphics controller and other circuitry, the organization of the components, and the order and timing of steps taken, as well as in the details of the illustrated system may be made without departing from the spirit of the invention.

We claim:

1. A method of processing a video signal from a computing device, the video signal including a first plurality of valid signal pulses, the method comprising the steps of:

generating a first plurality of invalid signal pulses onto the video signal; generating a first pulse sequence identifier onto the video signal;

transmitting the video signal to a display device;

decoding the first pulse sequence identifier from the video signal to distinguish the first plurality of valid signal pulses and the first plurality of invalid signal pulses, and to determine the location of a second pulse sequence identifier embedded in the video signal; and generating an output video signal from the video signal based on only the first plurality of valid signal pulses.

2. The method of claim 1, further comprising the steps of:

generating a second plurality of invalid signal pulses onto the video signal;

generating the second pulse sequence identifier onto the video signal;

decoding the second pulse sequence identifier from the video signal to distinguish the second plurality of valid signal pulses from the second plurality of invalid signal pulses; and generating an output video signal from the transmitted video signal using only the second plurality of valid signal pulses.

3. The method of claim 2, wherein the first, second, and subsequent pluralities of invalid signal pulses and the first, second, and subsequent pulse sequence identifiers are successively generated onto the video signal.

4. The method of claim 1, wherein the first plurality of invalid signal pulses and the first pulse sequence identifier are generated after generation of a predetermined number of subsequent pulse sequence identifiers.

5. The method of claim 1, wherein the first plurality of invalid signal pulses and the first pulse sequence identifier are generated onto the video signal during a blanking period.

6. The method of claim 1, further comprising the steps of:

polling the display device to determine if the display device includes a decode circuitry to perform the decoding step; and enabling the decode circuitry to perform the decoding step if the display device includes the decode circuitry.

7. The method of claim 1, further comprising:

polling a video source to determine if the video signal is unprotected; and disabling the generation of invalid signals if the video signal is unprotected.

8. The method of claim 1, wherein the valid signal pulses and the invalid signal pulses are horizontal sync pulses.

9. The method of claim 1, wherein the valid signal pulses and the invalid signal pulses are vertical sync pulses.

10. The method of claim 1, further comprising the steps:

polling the display device to determine if the display device is authorized to display the decoded video signal; and disabling decoding if the display device is not authorized.

* * * * *